Roy H. Cullen
Charles H. Elliott
Jimmie R. Aker
William E. Burke
INVENTORS

BY Hayden & Pravel

ATTORNEYS

Roy H. Cullen
Charles H. Elliott
Jimmie R. Aker
William E. Burke
INVENTORS BY Hayden & Pravel

ATTORNEYS

# United States Patent Office 3,446,297
Patented May 27, 1969

3,446,297
FLEXIBLE DRILL COLLAR
Roy H. Cullen, Charles H. Elliott, Jimmie R. Aker, and William E. Burke, Houston, Tex., assignors, by direct and mesne assignments, to The Youngstown Sheet and Tube Company, a corporation of Ohio
Continuation-in-part of application Ser. No. 501,936, Oct. 22, 1965. This application July 15, 1966, Ser. No. 581,666
Int. Cl. E21b *17/02;* E21c *15/00;* F16c *1/02*
U.S. Cl. 175—301                                24 Claims

ABSTRACT OF THE DISCLOSURE

This patent discloses a segmented drill collar which in one condition is rigid for drilling and in another condition is nonrigid for handling. The patent also discloses the combination of segmented drill collar with a jarring system to jar the segments loose one at a time.

---

This invention relates to a flexible drill collar, and more particularly, to a drill collar which is substantially rigid when used down hole in a well or the like but which is capable of flexing to provide ease of manipulation and storage thereof.

This application is a continuation-in-part of U.S. application Ser. No. 501,936, filed Oct. 22, 1965 now abandoned.

Drill collars are customarily utilized in drilling oil and gas wells by placing same in the drill string below the tubing and immediately above the bit. The weight of drill collars added to a drill string co-operates with the drill bit to maintain the hole in alignment with the drill string so that the continued progression of the bit into the earth's subsurface is straight and without substantial deviation. It will be appreciated that drill collars are long, heavy, and substantially rigid members which cannot be coiled or otherwise curved to any extent.

It is an object of the present invention to provide a new and improved drill collar which is rigid enough for drilling purposes when disposed in a well but which can be rendered flexible when it is desired to coil or otherwise curve such drill collar at the well surface.

An additional object of the present invention is to provide a new and improved drill collar which remains straight while down hole to guide the bit in the desired direction, and which is flexible above the wellhead for ease of handling and manipulation.

Another object of the present invention is to provide a new and improved drill collar having a plurality of annular segments adapted to be disposed along a length of flexible drilling hose which separate when desired to permit flexure of the hose and the drill collar.

One object of the present invention is to provide a flexible drill collar having a plurality of stacked segments which maintain an aligned position relative to one another and which are inhibited from shifting laterally of the longitudinal axis of the stacked segments.

An important object of the present invention is to provide a new and improved flexible drill collar having a plurality of annular segments adapted to be disposed on a central tension member so that such segments are longitudinally aligned by placing the tension member under tension.

Yet another object of the present invention is to provide a new and improved drill collar which utilizes structurally rigid but individually movable segments joined by nesting or telescoping means to obtain a rigid structure down hole.

A further object of the present invention is to provide a new and improved drill collar of segmented construction which is mounted on a tubular member for the flow of fluid therethrough during drilling operations or the like.

Another object of this invention is to provide a new and improved drill collar having a plurality of longitudinal segments which may be separately jarred loose from a stuck condition in a well whereby a relatively long drill collar may be freed by freeing the segments thereof successively.

Other objects and advantages of the present invention will become more readily apparent from an examination of the appended drawings and specification wherein:

FIG. 12 is a sectional view illustrating the connection means of FIGS. 10 and 11 in an extended flexed position for coiling and the like;

Figures 1, 2, 3:
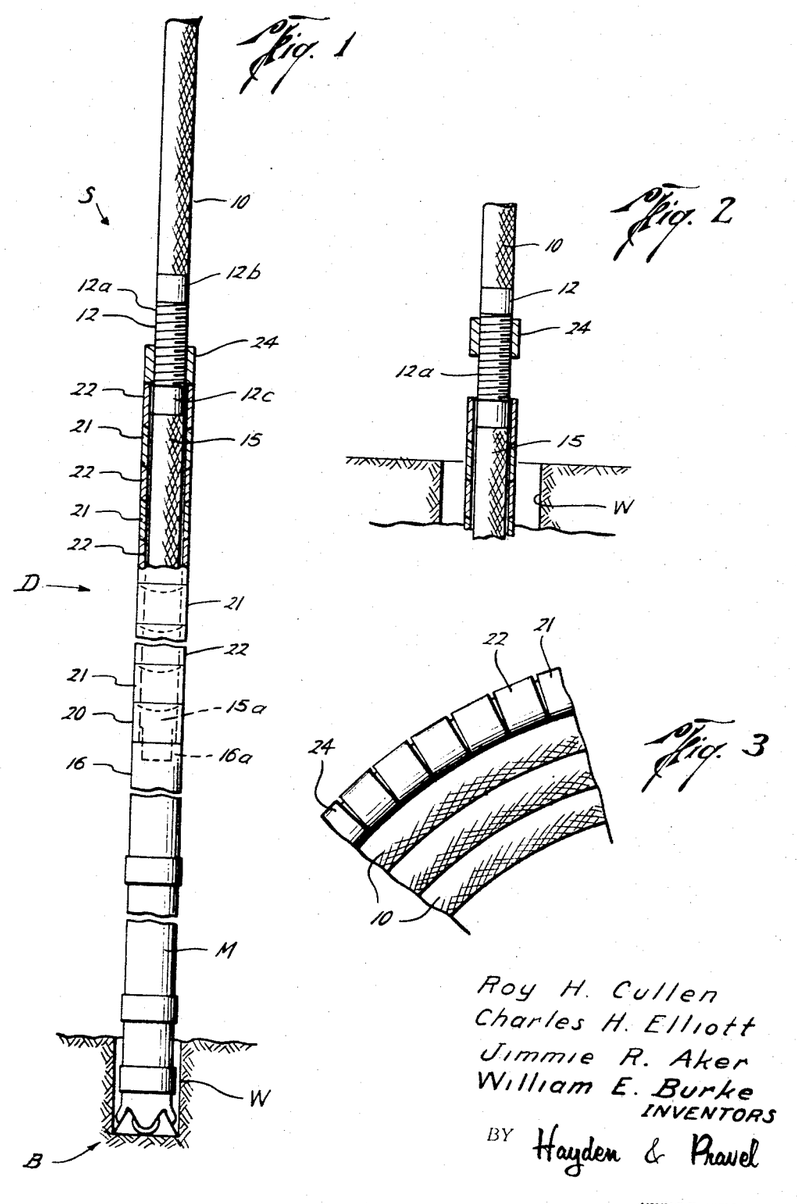
FIG. 1 is an elevational view of the present invention, partly in section, incorporated in a drill string within a well bore.
FIG. 2 is a sectional view, partly in elevation, illustrating the drill collar of the present invention as it is being raised out of a well bore.
FIG. 3 is a partial plan view of the drill collar of the present invention coiled with loops of the flexible drill stem for storage.

In the drawings, the letter D designates generally the flexible drill collar of this invention which is mounted as a part of a drill string S. A drill bit B is connected at the lower end of the drill string S for forming a well bore W in the earth's subsurface. A flexible, cylindrical tubing member or flexible pipe 10 preferably of the type shown in U.S. Patent No. 3,136,113 extends through the flexible drill collar D of the present invention, as will be fully explained. Briefly, the drill collar D is so constructed and mounted that it is straight or rigid when down hole in the well bore W, but it is capable of flexing when retrieved from the well bore W so that it may be coiled or otherwise curved for handling and/or storage.

Considering the invention more in detail, the flexible drill pipe or stem 10 is normally stored in a horizontally-disposed reel, an example of which is illustrated in U.S. Patent No. 2,989,980. The flexible drill pipe 10 with the drill collar D is fed into the well bore W by means of an apparatus such as that shown and described in U.S. Patent No. 2,892,535, so that bending, flexing, and coiling of the drill stem 10 is required.

The flexible drill stem 10 has a short section of pipe or rigid tubing 12 connected at couplings 12b and 12c, with threads 12a being formed externally thereon. The pipe 12 is connected above a lower section of flexible drill pipe or stem 15 which is preferably of the same type as the flexible pipe 10. The rigid tubing 12 provided between the segments of flexible drill stem 10 and 15 is joined thereto by conventional means, such as threaded couplings, welding or the like, and is axially communicated therewith by means of a passage for flowing well fluids therethrough and to the drill bit B. The drill string S includes the flexible tubular member 15 which is of any predetermined length. The tubular member 15 is connected at its lower end to the remainder of the drill string by means of conventional apparatus such as the safety sub 16. The safety sub 16 includes an internal connector joint 16a which threadedly connects to the lower end 15a of the flexible tubular member or pipe 15. The safety sub 16 is at the upper end of a power assembly for rotating the drill bit B, which assembly includes a motor M which is operated by electrical power supplied through an electrical cable (not shown) extending through the string S from the earth's surface, or by any other suitable means.

The flexible drill collar D of the present invention shown in FIG. 1 can be of any length. However, considering the illustrated structure by way of example, there is provided at the lower end of the collar D a drill collar segment 20 which is adapted to be abutted against means positioning and fixing the segment 20 relative to the lower end of the tubular member 15. More specifically, the lower end 15a of the tubular member 15 is threadedly engaged with the safety sub 16. The safety sub 16 includes an upwardly facing shoulder which is adapted to provide abutting contact and support for the rigid segment 20. The tubular segment 20 preferably has an internal diameter less than the external diameter of the safety sub 16 to provide the abutting relationship shown in the drawings. The safety sub 16, or other suitable means providing an upwardly facing shoulder at the lower end of the tubular member 15, supports and positions the lowermost segment 20 in the flexible drill collar D. Above the lowermost segment 20 are a plurality of additional segments located along the length of the flexible tubular member 15. Without elaborating on the description of the segments, for purposes of indication, the additional segments are denoted as segment 21 and segment 22.

The segments 21 and 22 are preferably equal in length and all other segments are also preferably equal in length for ease of fabrication, the flexible member 15 is fully longitudinally encompassed by the plurality of preferably identical segments. The segments 21 and 22 may be as short as a few inches or even a few feet long and are supplied in sufficient number to encompass the flexible tubular member 15. The segments are preferably rigid and cylindrical in shape, and concentrically arranged relative to the flexible member 15.

A threaded nut or segment 24 is provided at the upper end of the flexible tubular member 15 and is secured to the threaded tubular member 12. The segment or nut 24 is threaded at its internal surface and is adapted to engage the threads 12a on the exterior of the tubular member 12 as one means for securing the segments 24 relative to the drill string S. It should be recognized that the segment 24 is axially movable on rotation about the threads 12a and is adapted to provide tension in the tubular member 15 and compression in the segments 20, 21, and 22 of the drill collar D when the nut 24 is threaded downwardly on the member 12 while in engagement with the uppermost segment 22. However, if the nut 24 is threaded upwardly towards the upper end of the tubular member 12 as shown in FIG. 2, the nut releases compression, if any, in the flexible drill collar D and the tension, if any, in the drill pipe 15 to permit the member 15 to flex and bend as the segments 21 and 22 move therewith, as will be described. If the nut 24 is adjusted to provide or maintain enough tension in the central tubular member 15 so that it is taut, such tension serves to maintain the segments 20, 21, and 22 in axial alignment. It should be noted in FIG. 1 that the annular space between the segments and the member 15 may be small enough so that the member 15 when under tension tends to center or longitudinally align the segments 20, 21, and 22 with respect to one another.

Figure 4:
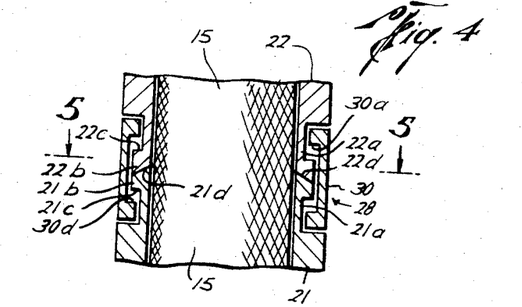
FIG. 4 is a sectional view, partly in elevation, illustrating in particular one form of means for connecting adjacent segments of the flexible drill collar of the present invention to one another.

Attention is next directed to FIG. 4 which illustrates the flexible drill stem 15 extending through the joint between a pair of adjacent segments 21 and 22. The joints are provided with telescoping connection means 28 which maintain the adjacent segments 21 and 22 in a coaxial or longitudinally-aligned relationship. More specifically, the telescoping means 28 includes a small sleeve 22a attached to or forming a part of the lower end of the segment 22 which terminates in an annular enlargement 22b which carries an upwardly facing shoulder 22c. Concentric with and spaced from the sleeve 22a is a similar appendage 21a carried on the lower segment 21. The segment 21a also includes an annular enlargement 21b having a downwardly facing shoulder 21c. The shoulders 21c and 22c serve as limit means whereby axial separation of the segments 21 and 22 is restrained. A sleeve 30 is fitted about the segments 21 and 22 and includes encircling shoulders 30a and 30d which face toward the shoulders 21c and 22c carried on the segments 21 and 22. The extent of the shoulders 30a and 30d is such that the two segments 21 and 22 may not be separated because the sleeve 30 locks the shoulders 21c and 22c formed on the segments 21 and 22.

Figure 5:
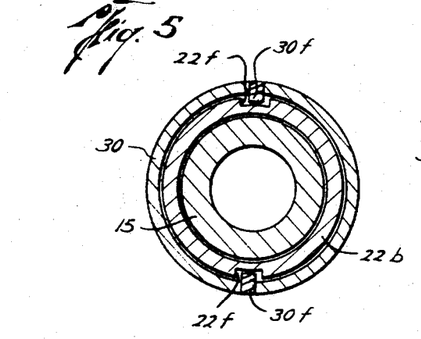
FIG. 5 is a cross-sectional view, taken along the line 5—5 of FIG. 4 for further illustrating the embodiment of FIG. 4.

It is sometimes desirable to provide means co-operating with the segments for transferring torque applied thereto in a fishing operation or the like. To this end, the sleeve 30 provided at the joint 28 includes a pair of key members 30f shown in FIG. 5. Each of the key members 30f is received within a keyway or slot 22f formed in the segment 22 as shown in FIG. 5. An additional slot 21f is formed in the enlargement 21b of the lower segment 21 (FIG. 5A) to lock segments 21 and 22 against relative rotation while permitting relative longitudinal movement therebetween.

Figure 6:
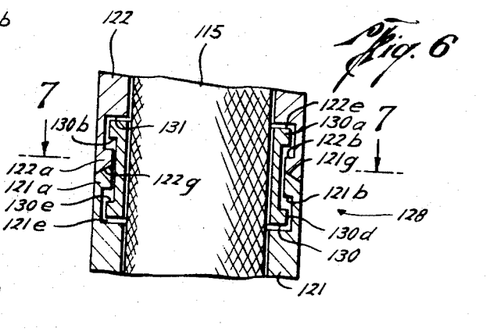
FIG. 6 is a sectional view, partly in elevation, of structure similar to that of FIG. 4, but illustrating another embodiment of connection means between the segments of the drill collar.

Attention is next directed to FIG. 6 which illustrates in sectional view additional joinder means 128 provided between the adjacent segments shown in FIG. 6. The lower segment is indicated at 121 and the upper segment is 122. The joinder means 128 includes a sleeve 130 disposed internally of the segments 121 and 122. Specifically, the sleeve 130 has a pair of upper and lower protruding annular enlargements 130a and 130d which carry a pair of facing shoulders 130b and 130e, respectively. The upper segment 122 includes an appended enlargement 122a which carries an upwardly facing, internal shoulder 122b facing the shoulder 130b formed on the sleeve 130. In like manner, the lower segment 121 includes an encircling annular structure 121a having a downwardly facing shoulder 121b which faces the shoulder 130e formed on the sleeve 130. Coacting guide surfaces 121g and 122g limit axial movement of the two segments 121 and 122 toward one another, and serve as means for effecting nesting or axial alignment of the segments so that when the two segments 121 and 122 are brought in the vicinity of one another, contact is made as indicated at inclined surfaces 121g and 122g which maintain the two segments in axial alignment in the same manner as guide surfaces 21d and 22d maintain the axial alignment of the segments 21 and 22 in the FIG. 4 form of the invention. Annular receptacles are provided at 121e and 122e within the segments to receive the enlargements carried on the sleeve 130 to permit movement of the segments relative to one another as limited by the surfaces 131 and the abutting contact of the shoulders. As will be appreciated from the drawings, some axial movement is permitted but is limited by the span of the sleeve 130 provided in the illustrated structure.

Figure 7:
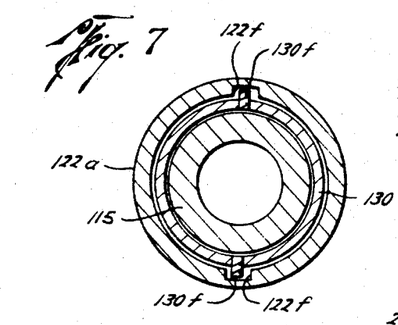
FIG. 7 is a cross-sectional view, taken along the line 7—7 of FIG. 6 for illustrating additional details of the embodiment of FIG. 6.
Figure 7A:
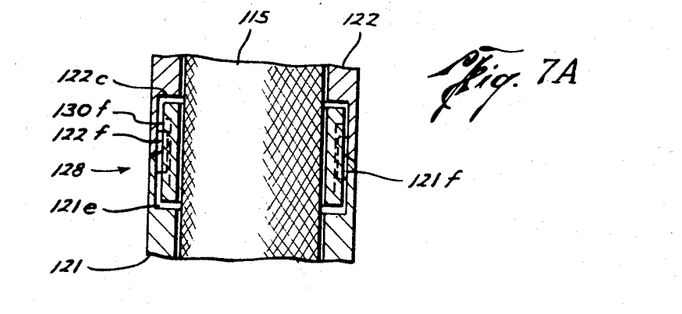
FIG. 7A is a sectional view taken along a diameter of the embodiment of FIG. 7 for illustrating torque transfer means for the drill collar of the present invention.

FIG. 7, which is a sectional view taken along the line 7—7 of FIG. 6, illustrates key means 130f at two locations on the sleeve 130 for transferring torque from one segment to the other. More specifically, the key members 130f extend along the exterior of the sleeve 130 and are received within keyway slots indicated at 122f in FIG. 7. In FIG. 7A, the slots 121f and 122f are shown in both segments 121 and 122 and it will be appreciated that the slots extend fully across the enlargements of the segments 121 and 122. Thus, the slots provided in both segments co-operate to receive the key or keys 130f so that rotation of one of the segments imparts rotation to the segment thereabove or therebelow.

Figure 8:
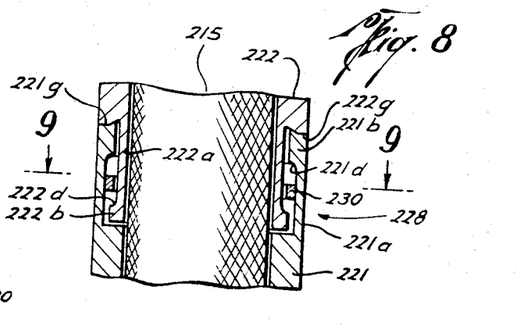
FIG. 8 is a sectional view, partly in elevation, of still another embodiment of the connection means provided between segments of the drill collar.

Attention is next directed to FIG. 8 which illustrates in sectional view an additional embodiment of the connector means indicated generally at 228. The means 228 permits telescoping of the segments 221 and 222 to accommodate axial movement thereof as will be explained. The lower segment 221 includes an annular sleeve 221a which terminates in an annular enlargement 221b. The enlargement has an encircling shoulder 221d which faces interiorly of and toward the major portion of the segment 221 for reasons to be explained.

The upper segment 222 is similar in construction to the lower segment 221 except that the appended sleeve 222a is smaller and fits within the sleeve 221a. The sleeve 222a terminates in an outwardly extending enlargement 222b and includes a shoulder 222d which faces the shoulder 221d. However, the enlargement 222b fits slidably within the sleeve 221a and is of a smaller external diameter than the internal diameter of the enlargement 221b, whereby the facing shoulders 221d and 222d do not prevent an assembly or separation of the segments 221 and 222.

A pair of almost tangential holes or ports 221e is provided through the wall of the tubular member 221 (see FIG. 9) and in communication with the annular space between the segments 221 and 222. A locking member 230 is placed in each of the semicircular spaces between the two segments 221 and 222 (FIG. 9) to prevent longitudinal separation of such segments while permitting relative longitudinal movement thereof until the shoulders 221d and 222d engage the locking members 230. Thus, the segments are brought together in the illustrated position of FIG. 8 and the locking members 230 are inserted through the tangential openings 221e to substantially encircle the appended sleeve 222a carried on the lower end of the segment 222. On insertion of each locking member 230 to the illustrated position, the port 221e therewith may be covered or sealed over by means such as welding or the like.

Figure 9:
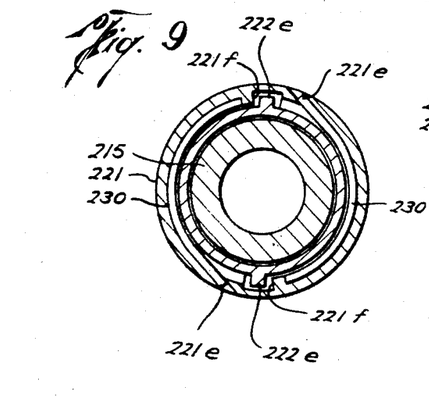
FIG. 9 is a cross-sectional view taken along the line 9—9 of FIG. 8 to illustrate further details of the embodiment of FIG. 8.
Figure 9A:
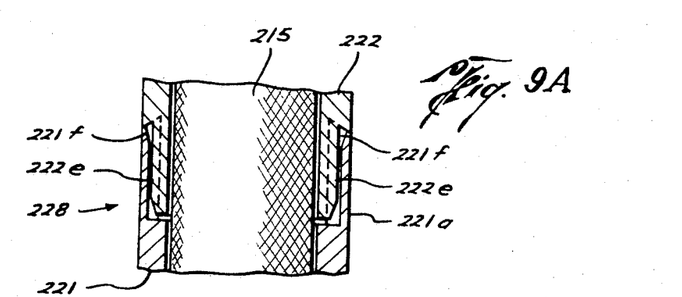
FIG. 9A is a sectional view taken along a diameter of the embodiment of FIG. 9 for illustrating torque transfer means for use in the present invention.

Means are preferably included with the segments 221 and 222 illustrated in FIGS. 8 and 9 for coupling torque to the adjacent segment. Reference is made to FIGS. 9 and 9A which illustrate a pair of spline or key members 222e extending into a pair of aligned key slots 221f to prevent rotation of the segments 221 and 222 relative to one another. The key members 222e preferably have sufficient length to span the face of the enlargement 221b to provide means therebetween for transferring torque from one segment to the other even when the segments are separated.

The adjacent segments 221 and 222 are provided with adjacent annular surfaces 221g and 222g, respectively, for abutment when the segments 221 and 222 are in the telescoped or rigid position. Preferably at least a portion of such surfaces 221g and 222g are inclined or tapered as shown to assist in the guiding of the segments 221 and 222 into axial alignment in the telescoped position, However, such surfaces 221g and 222g may be of entirely flat or radial, or of any other configuration in most instances because of the centering or aligning effect of the hose section 215 on such segments, as explained heretofore. The same is also true with respect to the guide surfaces 21d and 22d of FIG. 4 and surfaces 121g and 122g of FIG. 6.

While the foregoing discloses the present invention and relates same to the drawings, a description of the operation thereof will provide further understanding of the flexible drill collar D of the present invention. For purposes of description, it would be helpful to consider the drill collar D as it is run into the well bore W and is thereafter retrieved. Thus, when the bit B is lowered into the well bore W, the lowermost segment 20 is abutted on the safety sub 16. The additional segments 21 and 22 thereabove assume an abutting relationship as shown in FIG. 1. The drill collar nut 24 is in engagement with the uppermost segment 22 and is threaded on the threads 12a on the threaded tubing 12 (see FIG. 2) with sufficient turns to maintain the segments of the drill collar D in contact with each other. In some instances, it is desirable to rotate the nut 24 downwardly on the threads 12a even after all of the segments are in contact with each other to place the flexible hose section 15 under tension. Such tension in the section 15 serves to align the segments of the drill collar D axially, as previously pointed out. The rigid segments 20, 21, and 22 thus cooperate as a whole to form a rigid structure surrounding the flexible drill stem portion 15.

Also, as has been pointed out, the alignment and connector means 28, 128, or 228 shown in FIGS. 4–9 may be used to secure axial alignment of the segments of the drill collar D. As discussed above, the extent of lateral or radial movement of the segments 20, 21, and 22 is quite limited because the flexible tubular member 15 almost fully occupies the axial openings in the segments. The segments 20, 21, and 22 are thus at least partially aligned longitudinally by the hose or member 15, and the inclined surfaces such as 21d and 22d accomplish the full alignment of all of the segments 20, 21, and 22 longitudinally or axially.

The drill string S is lowered into the well bore W with the drill collar D in the rigid condition and the bit B is operated by the motor M within the well bore W in the conventional manner. During the drilling, well fluids flow down the flexible drill stem 10 and the section 15 inside of the flexible drill collar D.

When the drill string S is retrieved from the well bore W, it is normally desirable to store the flexible drill stem 10 by coiling it in a horizontal basket or reel (FIG. 3). During such retrieval, the upper end of the drill collar D reaches the surface, and the tubing 12 emerges from the well bore W and the drill collar nut 24 comes into view (see FIG. 2). The upward travel of the drill string S is temporarily halted, the uppermost segment 22 is gripped and held by any suitable apparatus, and then the nut 24 is rotated so as to move upwardly on the tubular member 12 a sufficient distance to release all tension from the hose section 15 and to provide a longitudinal space between the nut 24 and the uppermost drill collar segment 22. Then, with the uppermost segment 22 still supported against downward movement, the flexible string 10 is lowered to separate each of the segments at its connection means 28, 128, or 228 to some extent, and preferably to the maximum extent. The drill collar D is then flexible and may be lifted by pulling upwardly on the uppermost segment 22 for flexing or coiling the drill collar D as illustrated in FIG. 3.

If the segments 20, 21, and 22 have not been previously separated by pulling on the uppermost segment 22 as described above, they will separate, or partially separate automatically when the drill collar D is flexed or coiled as shown in FIG. 3. Thus, the drill collar D of the present invention becomes a flexible member which can be coiled, reeled, or otherwise flexed together with the flexible hose 10 and its lowermost hose section 15.

From the previous explanation, it will be appreciated that bending or coiling of the flexible drill stem portion 15 tends to unevenly separate the adjacent segments 21 and 22 as shown in FIG. 3. Considering FIG. 4 as an example, if the flexible member 15 bends to the left, then the contact of the segments 21 and 22 at the left-hand side of FIG. 4 is continued whereas separation of the segments at the right-hand side of FIG. 4 permits the member 15 to bend or flex while the segments 21 and 22 are positioned noncoaxially related to one another. Thus, the member 15 is allowed to bend fully along its length because of its flexible construction while the surrounding structure localizes the displacement at the joints between the segments. Flexure such as shown in FIG. 3 amounts to pivoting of one segment about a point of contact with the adjacent abutted segment. The alternative structures shown in FIGS. 6 and 8 also flex or bend in the same manner when the flexible drill stem portion 15 is bent.

Figure 5A:
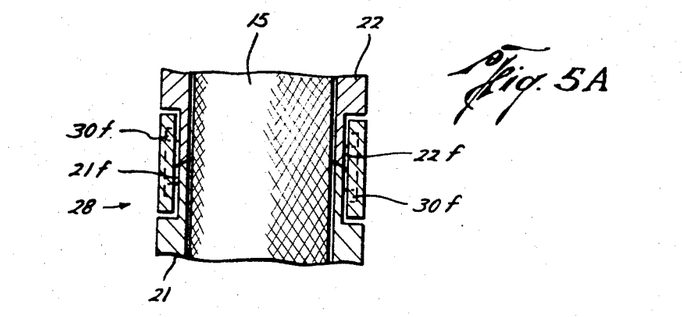
FIG. 5A is a sectional view taken along a diameter of the embodiment of FIG. 5 for illustrating torque transfer means.

Attention is directed to FIGS. 5A, 7A, and 9A which illustrate the key means positioned in the slots to resist torque and the resulting relative rotation between adjacent segments of the drill collar D. The key members 30f, 130f, and 222e function in connection with their respective slots 22f, 122f, and 221f to prevent the segments 20, 21, and 22 from rotating relative to each other when torque forces are exerted thereon. However, the drill collar D is suitable for use without such key members and their respective slots in most conditions of use, and therefore, they may be eliminated if desired.

It should also be noted that the nut 4 may be omitted under some conditions. For example, with the nut 24 omitted, the hose 10 may be pulled upwardly against the weight of the segments 20, 21, and 22 and the other weight such as the motor M and drill bit B suspended on the hose 10, to thus place the hose 10 under tension for maintaining the segments 20, 21, and 22 substantially in axial alignment with each other.

Figure 10:
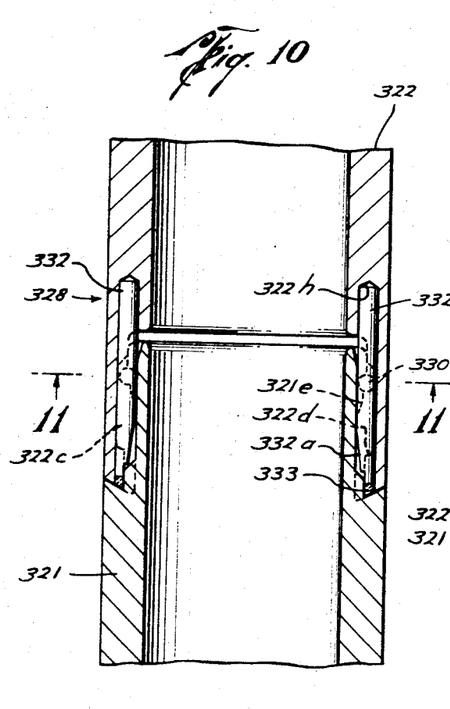
FIG. 10 is a sectional view illustrating a further embodiment of the connection means provided between segments of the drill collar.
Figure 11:
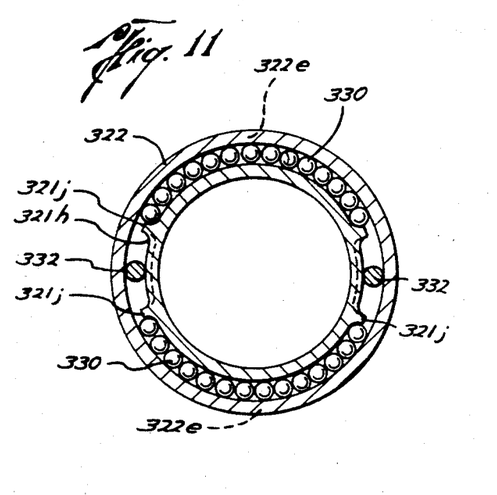
FIG. 11 is a cross-sectional view taken on line 11—11 of FIG. 10.
Figure 12:
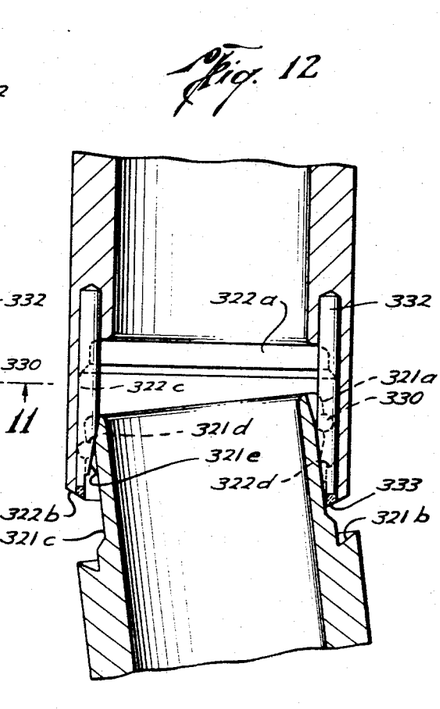

In FIGS. 10-12, a further embodiment of the connector means 328 is illustrated wherein two segments 321 and 322, corresponding to the segments 21 and 22 of FIG. 4, are connected. The connector means 328 differs from the other connector means 28, 128 and 228 in that the connector means 328 is locked in a rigid position so that it cannot flex when in the telescoped position of FIG. 10. Such rigidity as effected by an engagement of annular external surfaces 321a and 321b on the segment 321 with annular internal surfaces 322a and 322b, respectively, on the segment 322. An annular recess 322c is formed between the surfaces 322a and 322b so as to form a lower annular curved shoulder 322d. An internal annular recess 321c is provided between the surfaces 321a and 321b so as to form curved annular shoulder 321d. A plurality of circumferentially disposed locking balls 330 is confined in the recesses 321c and 322c between the shoulders 321d and 322d to prevent complete separation of the segments 321 and 322 while allowing limited relative longitudinal movement and limited lateral flexing movement (FIG. 12).

The balls 330 are confined in the same, or substantially the same circumferential plane by an annular projection 321e which has a smaller diameter than the surfaces 322a and 322c. The balls 330 are initially inserted into position through one or more openings 322e when the segments 322 and 321 are partially extended so that the balls 330 fall into place between the shoulder 321d and the shoulder 322d. Thereafter the openings 322e are closed by a plug or by welding.

The drill collar segments 321 and 322 are secured to one another to prevent relative rotation by means of a pair of locking pins 332. The pins are received in longitudinally-extending openings 322h within the wall of the segment 322 and span the ball locking projection 321e at an opening 321h provided therethrough (see FIG. 11). The pins 332 are secured in position by a weld fillet 333 after insertion into the openings 322h in the segment 322.

Limited rotation between the segment 321 and 322 is permitted by the locking pins 332 which extend between a pair of protruding arcuate shoulders 321j. The shoulders 321j cooperate with the locking projection 321e to also confine the locking balls 330 as shown in FIG. 11. The pins are preferably tapered by providing a flat surface 332a to accommodate flexure of the joint means 328. For example, reference is made to the pin 332 shown at the right of FIG. 12 which illustrates the segment 321 contacted against the flat 332a. Of course, the pins 332 are positioned to face the flats 332a radially inwardly toward the center line of the structure.

Torque is transferred by the means 328 because the segments 321 and 322 are locked against rotation. Specifically, the pins 332 are fixed relative to the segment 322 by the weld fillet 333 which secures the pins in the holes 322h. The segment 321 is not free to rotate since the upstanding shoulders 321j abut the pins 332 at the extremes of movement permitted by the structure (see FIG. 11).

On flexure, the joint means 328 is moved from the telescoped position of FIG. 10 to a limited, canted position of FIG. 12. The balls 330 are limited in movement by the shoulders 321d and 322d while resting on the projection 321e. A locking position resulting from the lack of clearance of balls 330 over the shoulder 322d is best illustrated at the left side of FIG. 12. Thus, flexure is permitted to accommodate coiling or bending of the drill collar as exemplified by FIG. 3.

Figures 13, 14:
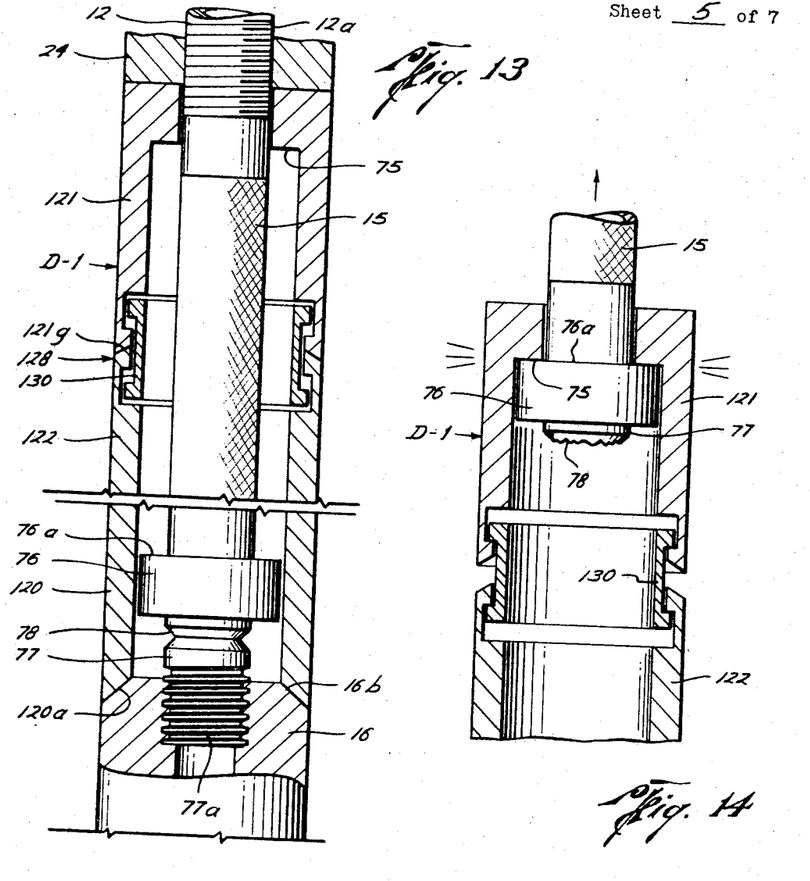
FIG. 13 is a partial view, partly in elevation and partly in section, of another form of the flexible drill collar of this invention.
FIG. 14 is a view of a portion of the drill collar of FIG. 13, illustrating jarring therewith to free the drill collar when stuck in a well.

In FIGS. 13 and 14, a modified flexible drill collar D-1 is illustrated in a partial view to illustrate in detail a jarring feature of the present invention. Although the drill collar D-1 may take many forms, it is illustrated as being composed of a plurality of segments 121 and 122 and a joinder means 128 identical with that illustrated in FIGS. 6 and 7 of the drawings. Accordingly, corresponding parts in FIGS. 13 and 14 to those illustrated in FIGS. 6 and 7 have like numeral and letter designations.

The lowermost segment 120 of the drill collar D-1 corresponds with the lowermost segment 20 of the drill collar D of FIG. 1, but it is modified to the extent that it has an upwardly and inwardly tapered or inclined lower surface 120a which is adapted to seat on an upwardly and inwardly inclined surface 16b of the safety sub 16. Such coaction between the inclined surfaces 120a and 16b serves to assure alignment of the entire drill collar D-1 with the safety sub 16 as illustrated in FIG. 13.

It will be appreciated that the drill collar D-1 may have a relatively large number of the pairs of segments 121 and 122 in the same manner as illustrated for the drill collar D of FIG. 1. The upper drill collar segment 121 is modified as seen in FIG. 13 to provide an inner annular surface 75 which serves as a jarring surface during jarring operations, as will be more fully explained. The drill collar D-1 is assembled over a section of pipe or tubing 15, which preferably is of the flexible type as described in connection with the drill collar D of FIG. 1, although it may be rigid tubing in some cases. The tubular member 15 has a rigid short section of pipe 12 connected thereto with threads 12a formed externally thereon in the same manner as for the portion illustrated in FIG. 1, and the nut 24 is likewise threaded thereon as described in connection with the drill collar D of FIG. 1 to maintain the segments 121 and 122 rigid during drilling operations. The pipe section 12 may have a section of flexible drill stem such as indicated at 10 in FIG. 1 connected thereabove, or it may be conventional, rigid drill pipe or well pipe as the case may be.

With the form of the invention illustrated in FIGS. 13 and 14, the tubular section 15 has a special jarring head 76 formed therewith, having an upper annular jarring surface 76a which is adapted to engage the jarring surface 75 of the upper segment 121 during jarring operations, as will be more evident hereinafter. The lower end of the tubular section 15 is formed with a rigid metal section, preferably of steel, indicated at 77 which has a severing notch 78 formed externally or internally thereof. Such notch 78 provides a point of weakness for separation when it becomes necessary to provide jarring action. The lower portion of the section 77 has threads 77a, preferably of the relatively coarse type to facilitate a release of such threads under some circumstances when it is desired to effect a jarring action, as will be evident from the following description.

Thus, with the form of the invention illustrated in FIGS. 13 and 14, normal uses of the flexible drill collar D-1 may take place with the drill collar D-1 assembled as shown in FIG. 13. The drill collar D-1 may be maintained in a rigid condition similar to that illustrated in FIG. 1 of the drawings for drilling purposes, or it may be released for coiling similarly to that illustrated in FIG. 3 of the drawings for the drill collar D. In the event the drill collar D-1 becomes stuck in a well bore by reason of an accumulation of sand or shale or other material around the drill collar, or for some other reason, and it becomes necessary to try to retrieve such drill collar D-1 for the recovery of it and for subsequent fishing operations, the form of the invention illustrated in FIGS. 13 and 14 makes such retrieval possible.

Thus, upon determining that the drill collar D-1 is stuck in the well bore, the drill pipe or flexible pipe 10 above the pipe section 12 may be rotated to initially attempt to release the threads 77a from the sub 16. If such threads 77a can be released, the lower end of the section 15 is thus free from the sub 16 and a longitudinal upward movement of the jarring hammer 76 may be accomplished to bring it into jarring contact with the jarring surface 75 as illustrated in FIG. 14. However, if the threads 77a cannot be released, a sufficient pulling force may be exerted on the drill pipe or other flexible pipe 10 and the tubular section 15 to sever the pipe section 77 at the weak area provided by the notch 78. FIG. 14 illustrates the jarring action which occurs after such severing at the notch 78. It should be understood that the notch 78 is illustrated as being completely annular, although this may be varied to determine the predetermined amount of release force for accomplishing the severing of the section 77 at the weakness area provided by the notch or notches 78.

Repeated jarring upwardly may be accomplished by raising and lowering the tubular section 15 to repeatedly bring the jarring hammer 76 into contact with the jarring surface 75. One of the principal features of the invention resides in the fact that the uppermost segment 121 may be initially released, and since it is relatively short as compared with the full length of the drill collar D-1, such release may be much more easily accomplished than if an effort were made to release the entire drill collar D-1 at one time. It is therefore possible with the present invention to successively release the segments 121 and 122 starting with the uppermost segment being released first and then working downwardly until all of the segments, including the lowermost segment 120, are released or loosened from their stuck condition so that they may be retrieved upwardly and out of the well. After the retrieval of the drill collar D-1, the motor M and the parts therewith may be retrieved by conventional fishing operations.

Figure 15:
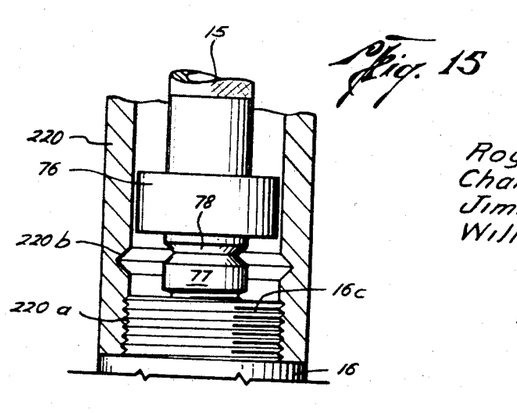
FIG. 15 is a partial view of a modification of the drill collar of FIG. 13.

FIG. 15 is a modification illustrating the lowermost segment 220 with internal threads 220a threadedly engaged with corresponding threads 16c on the sub 16. In order to release the lowermost segment 220 ultimately from the safety sub 16, a weakened area indicated by the notch 220b is provided so that after all of the segments above the lowermost segment 220 have been loosened, the segment 220 may be severed at the weakened area 220 so that the entire drill collar may be then released and removed from the well bore.

Figure 16:
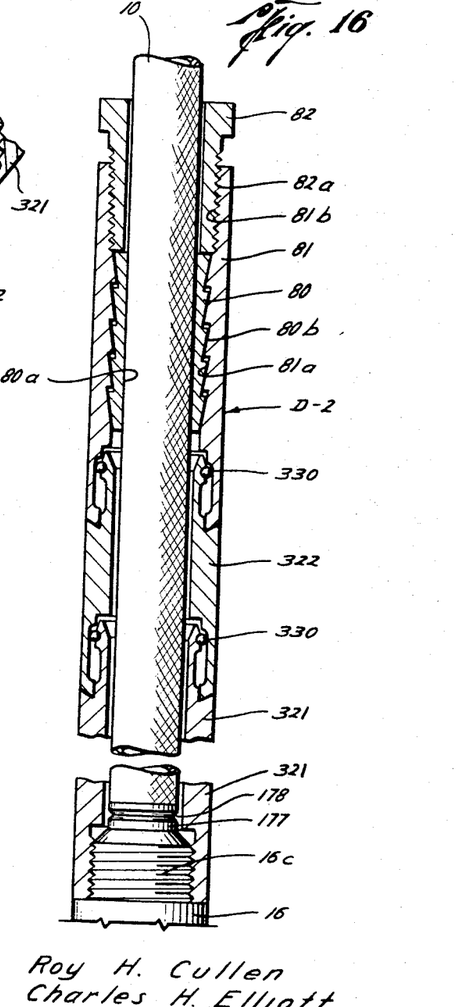
FIG. 16 is a view, partly in elevation and partly in section, illustrating another form of the invention wherein the drill collar is in the rigid position.
Figure 17:
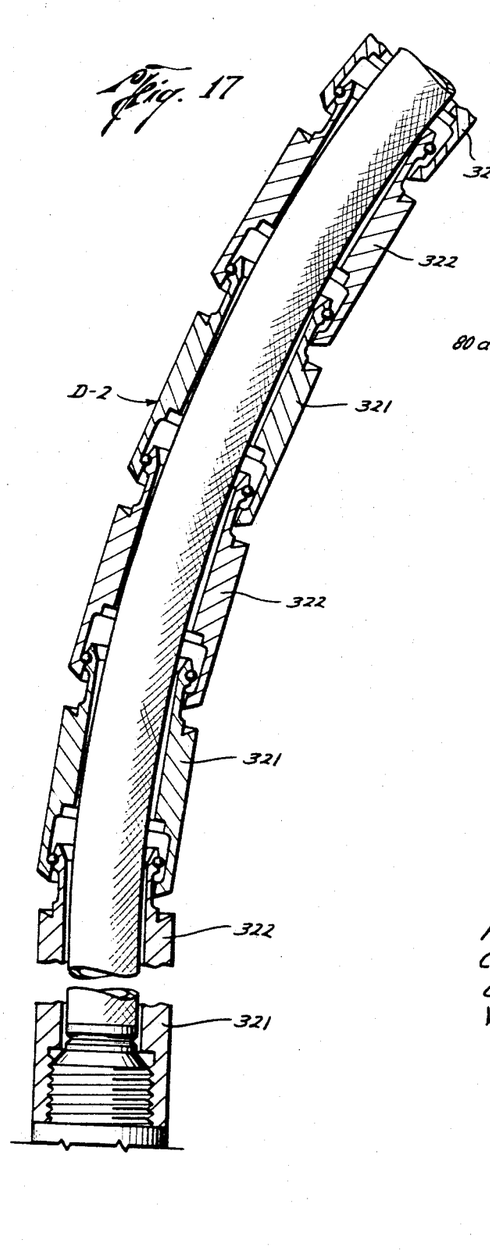
FIG. 17 is a view, partly in elevation and partly in section, illustrating the form of the drill collar of FIG. 16 in a flexible position.

In FIGS. 16 and 17, a modification is illustrated which avoids the use of the relatively stiff threaded section 12 of the FIG. 1 form of the invention. The modified drill collar D-2 of FIGS. 16 and 17 may be provided with segments formed in any of the previously described forms, but as illustrated, the segments are those illustrated in FIGS. 10-12 and are therefore numbered 321 and 322, with the locking balls 330 also illustrated. Since the relatively rigid section 12 of FIG. 1 is not used in the form of the invention shown in FIGS. 16 and 17, the flexible pipe 10 is shown as continuing down into the drill collar D-2. Preferably, the lowermost segment 321 of the form of the invention illustrated in FIGS. 16 and 17 is internally threaded for threaded engagement with an upstanding threaded portion 16c of the sub 16.

The lower end of the flexible pipe or drill stem 10 is preferably attached to the threaded sub section 16c by an annular ring 177 having a weakened section 178, preferably annular so that upon proper jarring action on the flexible pipe 10, as will be more fully explained, the ring 177 may be severed at the weakened groove or portion 178 to release the flexible pipe 10 from the sub 16.

For gripping the flexible portion of the pipe 10 at the upper part of the drill collar D-2, a collet 80 is formed of a lurality of arcuate sections having an inner bore 80a which conforms generally with the curvature of the flexible pipe 10. The external surface of each of the arcuate segments of the collet 80 is formed with a plurality of downwardly and inwardly tapered arcuate wedge surfaces 80b which are adapted to fit within corresponding wedged internal surfaces 81a of a sleeve 81. The sleeve 81 forms a part of the upper linkage of the drill collar D-2 and provides a means for urging the segments of the collet 80 inwardly for gripping the flexible pipe 10. Thus, upon a relative movement of the arcuate segments of the collet 80 downwardly with respect to the sleeve 81, they are caused to move radially inwardly to grip the external surface of the flexible pipe 10. As illustrated in FIG. 16, a drill collar nut 82 having external threads 82a is adapted to be threaded into internal threads 81b of the sleeve 81 so as to apply a downward movement to the segments of the collet 80 relative to the sleeve 81 for obtaining the gripping action between the collet sections or segments 80 and the external surface of the flexible pipe 10. The collet 80 is shown in the gripping position in FIG. 16, but upon movement of the nut 82 upwardly, the collet 80 may also be moved upwardly with respect to the sleeve 81 to release the gripping action of the segments of the collet 80 with respect to flexible pipe 10. FIG. 16 illustrates the form of the invention using the collet 80 with the segments 321 and 322 in the telescoped or rigid position, corresponding to that illustrated in FIG. 10 of the drawings.

FIG. 17, on the other hand, illustrates the segments 321 and 322 in the flexible position for coiling or curving same or for performing operations requiring a curved drill stem. The collet segments 80 may be locked in gripping engagement with the flexible pipe 10 when the segments 321 and 322 are in the extended or flexible position of FIG. 17 so as to retain the drill collar D-2 in a flexible condition under some circumstances.

In the operation or use of the form of the invention shown in FIGS. 16 and 17, it will normally be disposed down hole with the drill collar D-2 in the rigid position or condition of FIG. 16. To place the drill collar D-2 in the flexible position or condition illustrated in FIG. 17, the flexible pipe 10 is raised, using any suitable apparatus such as the gripping apparatus illustrated in United States Patent No. 2,892,535. When the drill collar nut 82 has reached the surface and is exposed so that emergency grippers can be placed about the sleeve 81, the drill collar nut 82 is then loosened to release the collet 80 from its gripping action on the flexible pipe 10. Then, while still holding the sleeve 81 in the emergency grippers or other suitable support at the surface, the flexible pipe 10 is lowered, allowing the connections between the segments 321 and 322 to extend some, preferably to their maximum extent such as illustrated in FIG. 17. The drill collar nut 82 is then again tightened to bring the collet segments 80 into gripping engagement with the flexible pipe 10. The emergency grippers or other support for the sleeve 81 is then released, and the entire drill collar D-2 may be removed from the well in the flexible condition illustrated in FIG. 17.

In some cases it may be desirable to apply a jar to the lower end of the flexible pipe 10 prior to coming out of the well. By jarring on the flexible pipe 10 using suitable jars or jarring action at the surface, the weakened recess or portion 178 is split to sever the lower end of the flexible pipe 10 from the sub 16. Thereafter, the flexible pipe 10 is pulled upwardly to successively extend the segments with respect to each other until they are fully extended. As pointed out above in connection with FIGS. 13-15, this may be of particular value if the drill collar D-2 has become stuck in the well bore.

Figure 18:
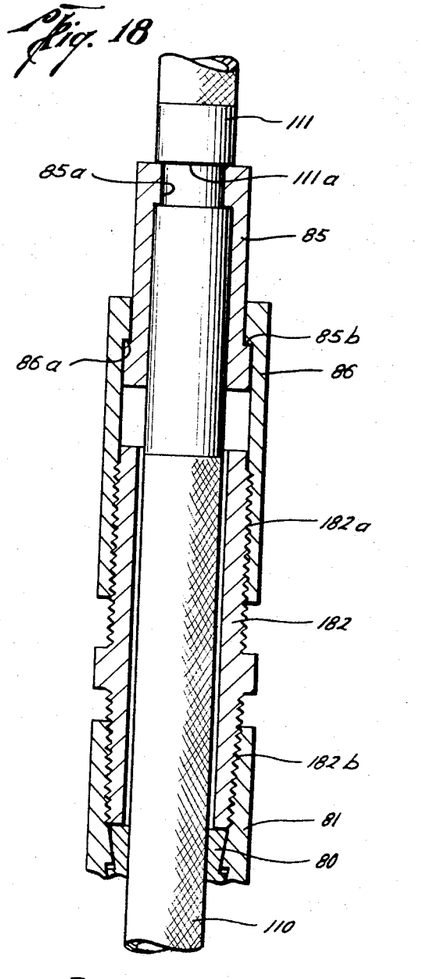
FIG. 18 is a partial view of a modified portion of the drill collar of FIGS. 16 and 17.

In FIG. 18, a modified form of the means for connecting the drill collar D-2 to the flexible pipe 10 is illustrated. The flexible pipe 10 is modified in FIG. 18 and therefore is numbered 110 since it has a rigid section 111 formed at an area in proximity to the upper end of the drill collar D-2 for assisting in anchoring the drill collar D-2 on the flexible pipe 10. Such rigid collar 111 is formed with a passage therethrough in the same manner as the flexible pipe 110, and it is further provided with an annular groove 111a. Such groove 111a is adapted to receive a split housing 85 forming part of the means for connecting the drill collar D-2 to the flexible pipe 110. Thus, the flexible housing 85 fits within a sleeve 86 having threaded connection with a drill collar nut 182. The drill collar nut 182 preferably has upper threads 182a and lower threads 182b which are formed in the same direction so that upon a rotation of the nut 182, it threads inwardly with respect to the sleeve 81. After the nut 182 has been threaded downwardly to cause the collet 80 to grip the flexible pipe 110, then the sleeve 86 is threaded onto the threads 182a until the shoulder 86a engages the shoulder 85b as shown in FIG. 18. Such arrangement of the threads 182a and 182b may, of course, be modified if desired. The nut 182 engages the upper end of the collet 80 in the same manner as the nut 82, previously described in connection with FIG. 16. The inwardly extending arcuate shoulders 85a on the housing 85 extend into the groove or recess 111a so that longitudinal movement of the housing 85 with respect to the coupling or rigid section 111 is avoided. Likewise, external lower shoulders 85b engage within the inwardly extending annular shoulder 86a of the sleeve 86 so that the sleeve 86 is prevented from moving downwardly with respect to the coupling 111. Thus, when the nut 182 has been tightened, the upper end thereof is effectively prevented from shifting longitudinally with respect to the rigid coupling or section 111, and this assures a firm gripping action by the collet 80 on the flexible pipe 110 in the same manner as described heretofore in connection with FIG. 16.

Figure 19:
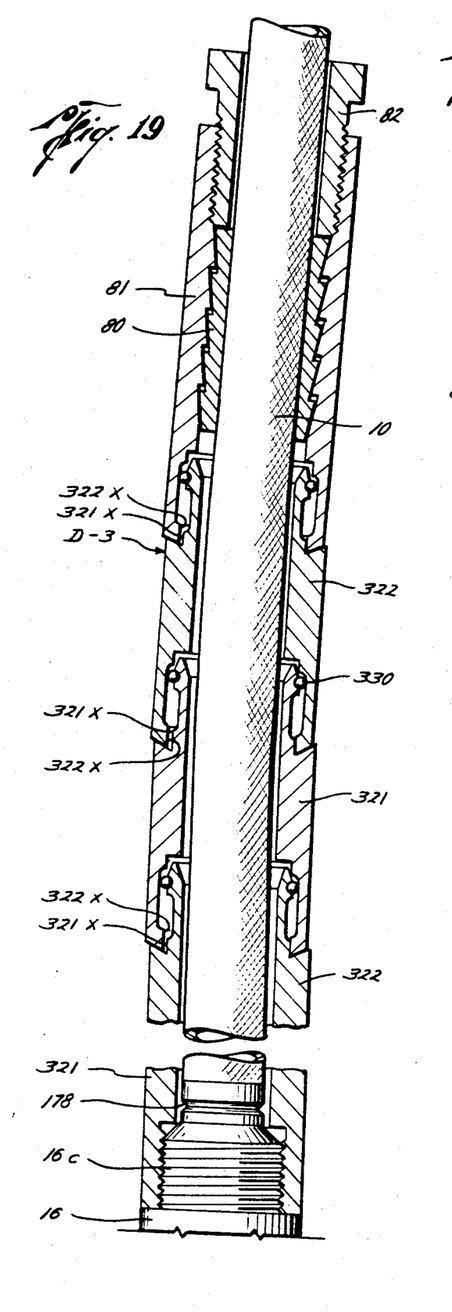
FIG. 19 is a view, partly in elevation and partly in section, illustrating a modified form of the invention for use in directional drilling.

FIG. 19 shows a modification of the form of the invention illustrated in FIG. 16 for use in directional drilling operations. Thus, all of the parts of the components illustrated in FIG. 19 which correspond with those shown in FIG. 16 have like numerals and letter designations. However, the form illustrated in FIG. 19 is modified as compared to FIG. 16 in that the internal surface or diameter 322x is normally spaced from the external surface 321x at the joint between each of the annular segments 321 and 322. The lateral spacing thus provided prevents the drill collar D-3 of FIG. 19 from becoming fully rigid as is the case with a drill collar D-2. Therefore, when the drill collar D-3 is in the well bore and the bit is on the bottom thereof, and it becomes desirable to change the direction of drilling, such change or deviation can be effected by causing the drill collar D-3 to follow a whipstock or other directional deviation device. During such change in direction, the drill collar D-3 is caused to curve to some extent until the surfaces 321x and 322x engage on one side such as indicated on the right-hand side of FIG. 19 and are spaced on the left-hand or other side thereof as viewed in FIG. 19. It will be understood that the use of the lateral spacing of the surfaces 321x and 322x for accomplishing the directional drilling may be utilized in conjunction with the other forms of the invention such as those illustrated in FIGS. 4-9.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:
1. A drill collar, comprising:
  (a) a flexible tubular member adapted to extend longitudinally in a well bore,
  (b) said tubular member having a longitudinal passage therethrough for the flow of fluid,
  (c) a plurality of annular segments arranged longitudinally of and about said tubular member,
  (d) each of said segments being separately movable longitudinally with respect to each other, and
  (e) means connected to the tubular member and longitudinally adjustable relative to the segments for confining said segments when disposed longitudinally in a well bore to form a substantially rigid assembly of said segments.
2. The structure set forth in claim 1, including:
  (a) means on said tubular member for imparting a successive jarring action to said segments for jarring same loose from a stuck condition in a well bore.
3. The structure set forth in claim 1, including:
  (a) means connecting said segments together for limited longitudinal separation from each other and relative to said tubular member so that said tubular member may be curved with the segments thereon.
4. The structure set forth in claim 1 in combination with
  (a) means on each of said segments for interlocking the adjacent segments for limited longitudinal separation relative to each other whereby such segments become a flexible assembly which may be curved.
5. The structure set forth in claim 1, including:
  (a) guide means on the adjacent ends of the segments for guiding the segments into axial alignment with each other.
6. The structure set forth in claim 1, including:
  (a) key means interconnecting adjacent segments for preventing relative rotation of the segments.
7. The structure set forth in claim 1 in combination with
  (a) each of said segments adjacent to another of said segments having a shoulder adapted to abut a corresponding shoulder on the adjacent segment, and
(b) locking means secured to each of the adjacent segments for permitting limited separation of said shoulders.

8. The structure set forth in claim 1 in combination with
(a) each of said segments adjacent to another of said segments having a shoulder adapted to abut a corresponding shoulder on the adjacent segment,
(b) a plurality of locking balls disposed annularly between adjacent ends of said segments, and
(c) means on each of the pairs of adjacent segments for maintaining the locking balls between the adjacent ends of the segments upon limited relative longitudinal movement of said segments with respect to each other.

9. The structure set forth in claim 1, including:
(a) a jarring surface on the uppermost of said segments, and
(b) a jarring head on a lower portion of said tubular member for movement thereof longitudinally relative to said segments and into jarring contact with said jarring surface to successively free the segments from the uppermost segment downwardly when they become stuck in a well bore.

10. The structure set for the in claim 1, including:
(a) gripper means for locking the upper of said annular segments to the flexible tubular member, and
(b) means for obtaining longitudinal movement of said segments relative to each other when the upper of said annular segments is locked to said flexible tubular member by said gripper means for thereby obtaining jarring action with the drill collar.

11. The structure set forth in claim 1, including:
(a) means on the adjacent annular segments for providing limited lateral movement of the segments when they are in a longitudinally telescoped position, whereby directional drilling may be effected.

12. A drill collar, comprising:
(a) a flexible tubular member;
(b) said member having passage means therethrough for the flow of well fluids;
(c) a plurality of annular segments arranged longitudinally of and about said tubular member;
(d) each of said segments being separately movable and adapted to abut an adjacent segment thereabove or therebelow;
(e) means on said tubular member for securing the lowermost of said segments relative to said tubular member; and
(f) adjustable means confining said segments above the lowermost segment in abutment with each other and resting on the lowermost segment for permitting limited longitudinal movement of said segments relative to each other and relative to said tubular member so that said tubular member may be curved with the segments thereon and for also rendering said segments rigid when said adjustable means is tightened.

13. A drill collar, comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) means connecting said segments above the lowermost segment together and to the lowermost segment for limited longitudinal movement relative to each other and relative to said tubular member so that tubular member may be curved with the segments thereon; and
(g) means connected to said tubular member above the uppermost of said segments for maintaining the adjacent segments in abutting relationship to thereby rigidify the assembly of the segments.

14. A drill collar, comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) means connecting said segments above the lowermost segment together and to the lowermost segment for limited longitudinal movement relative to each other and relative to said tubular member so that said tubular member may be curved with the segments thereon; and
(g) guide means on the abutting ends of said segments for guiding adjacent segments into axial alignment with each other.

15. A drill collar, comprising:
(a) a flexible tubular member;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) means connecting said segments above the lowermost segment together and to the lowermost segment for limited longitudinal movement relative to each other and relative to said tubular member so that said tubular member may be curved with the segments thereon; and
(g) said last-named means including annular connection means at the adjacent ends of adjacent segments having therewith interlocking shoulder means on said segments for providing a limited longitudinal separation of the adjacent segments for flexing thereof.

16. A drill collar, comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) means connecting said segments above the lowermost segment together and to the lowermost segment for limited longitudinal movement relative to each other and relative to said tubular member so that said tubular member may be curved with the segments thereon; and (g) key means interconnecting adjacent segments for preventing relative rotation of the segments.

17. A drill collar, comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) a sleeve spanning the abutting ends of adjacent segments;
(g) shoulders on said sleeve;
(h) shoulders on said segments for abutting said shoulders on said sleeve on moving said segments relatively apart from one another; and
(i) said shoulders limiting axial separation of said segments.

18. The structure set forth in claim 17 wherein said sleeve is positioned exteriorally of said segments.

19. The structure set forth in claim 17 wherein said sleeve is positioned interiorally of said segments.

20. A drill collar, comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) a pair of shoulders on said abutting segments;
(g) said shoulders facing and extending toward one another; and
(h) a locking member adapted to contact each of said shoulders when said segments are separated from an abutting relationship.

21. A drill collar comprising:
(a) a tubular member made of a flexible material adapted to bend to a desired radius of curvature;
(b) said member having passage means therethrough for the flow of well fluids;
(c) a plurality of annular segments arranged longitudinally of and about said tubular member;
(d) each of said segments being adapted to abut an adjacent segment thereabove or therebelow to form a substantially rigid assembly;
(e) means on said tubular member for securing the lowermost of said segments relative to said tubular member;
(f) a longitudinally extending member fixedly attached to one of a pair of adjacent segments; and
(g) means carried on the other of said adjacent segments for engaging said fixed member on relative rotation between said segments in either direction for transferring torque between said adjacent segments.

22. The structure set forth in claim 21 including a pair of shoulders on said adjacent segments, a plurality of locking balls positioned between said segments and said shoulders, and a locking projection parallel to and spaced from one of said shoulders and formed on the same segment therewith for securing said locking balls therethrough on relative longitudinal movement of said segments.

23. A drill collar, comprising:
(a) a tubular member adapted to extend longitudinally in a well bore,
(b) said tubular member having a longitudinal passage therethrough for the flow of fluid,
(c) a plurality of annular segments arranged longitudinally of and about said tubular member,
(d) each of said segments being separately movable longitudinally with respect to each other,
(e) means connected to the tubular member and longitudinally adjustable relative to the segments for confining said segments when disposed longitudinally in a well bore to form a substantially rigid assembly of said segments,
(f) a jarring surface on the upper most of said segments, and
(g) a jarring head on a lower portion of said tubular member for movement thereof longitudinally relative to said segments and into jarring contact with said jarring surface to successively free the segments from the uppermost segment downwardly when they become stuck in a well bore.

24. A drill collar, comprising:
(a) a tubular member adapted to extend longitudinally in a well bore,
(b) said tubular member having a longitudinal passage therethrough for the flow of fluid,
(c) a plurality of annular segments arranged longitudinally of and about said tubular member,
(d) each of said segments being separately movable longitudinally with respect to each other,
(e) means connected to the tubular member and longitudinally adjustable relative to the segments for confining said segments when disposed longitudinally in a well bore to form a substantially rigid assembly of said segments,
(f) gripper means for locking the upper of said annular segments to the tubular member, and
(g) means for obtaining longitudinal movement of said segments relative to each other when the upper of said annular segments is locked to said tubular member by said gripper means for thereby obtaining jarring action with the drill collar.

References Cited

UNITED STATES PATENTS

| | | | |
|---|---|---|---|
| 58,650 | 8/1866 | King | 175—320 |
| 1,701,427 | 2/1929 | Shields | 175—325 X |
| 1,745,351 | 2/1930 | Bishop | 175—325 X |
| 2,496,412 | 2/1950 | Scheppe | 64—2 |
| 2,626,781 | 1/1953 | Reynolds | 175—301 X |
| 2,717,146 | 9/1955 | Zublin | 64—2 |
| 2,876,993 | 3/1959 | Hooks | 175—301 |
| 3,203,285 | 8/1965 | Schmidt | 64—2 |
| 3,233,690 | 2/1966 | Lawrence | 175—320 |
| 3,257,827 | 6/1966 | Hughes | 175—320 X |

CHARLES E. O'CONNELL, Primary Examiner.

R. A. FAVREAU, Assistant Examiner.

U.S. Cl. X.R.

64—2; 175—320